United States Patent
Skelton et al.

[11] Patent Number: 6,147,526
[45] Date of Patent: Nov. 14, 2000

[54] RIPPLE REGULATOR WITH IMPROVED INITIAL ACCURACY AND NOISE IMMUNITY

[75] Inventors: Dale J. Skelton, Plano; Steven C. Jones, Allen; Taylor R. Efland, Richardson; Lester L. Hodson, McKinney, all of Tex.

[73] Assignee: Texas Instruments Incorporated, Dallas, Tex.

[21] Appl. No.: 09/213,308

[22] Filed: Dec. 16, 1998

Related U.S. Application Data

[60] Provisional application No. 60/068,546, Dec. 23, 1997.

[51] Int. Cl.[7] .................................................. H03K 7/08
[52] U.S. Cl. ........................................... 327/134; 327/172
[58] Field of Search ........................... 327/54–57, 63–64, 327/67, 68, 72–80, 89, 90, 107, 131–135, 136, 166, 170, 172–176, 205, 227, 230

[56] References Cited

U.S. PATENT DOCUMENTS

| | | | |
|---|---|---|---|
| 4,011,507 | 3/1977 | Rossell | 327/76 |
| 4,017,747 | 4/1977 | Sheng | 327/76 |
| 5,394,020 | 2/1995 | Nienaber | 327/140 |
| 5,592,128 | 1/1997 | Hwang | 331/61 |
| 5,684,424 | 11/1997 | Felix et al. | 327/293 |
| 5,912,593 | 6/1999 | Susak et al. | 331/111 |

*Primary Examiner*—My-Trang Nuton
*Attorney, Agent, or Firm*—Wade James Brady III; Frederick J. Telecky Jr.

[57] ABSTRACT

A DC—DC converter having an input node receiving an input voltage $V_{IN}$ and generating an output voltage $V_{OUT}$. A reference voltage generator provides a voltage $V_{REF}$ and a hysteresis voltage generator provides a voltage $V_{HYST}$. A first comparator generates a signal determined from a difference between $V_{REF}$ and $V_{OUT}$. A second comparator generates a signal determined from a difference between $V_{OUT}$ and $V_{HYST}$. A latch is coupled to receive the outputs of the first and second comparators, and to generate an output. A driver circuit receives the latch output and generates a PWM signal used to switch the output stage. A double pulse suppression circuit masks off the latch inputs for a preselected time during the switching intervals fo the main power transistors to eliminate noise jitter.

18 Claims, 3 Drawing Sheets

RIPPLE REGULATOR WITH IMPROVED INITIAL ACCURACY AND NOISE IMMUNITY

This application claims priority under 35 USC § 119(e)(1) of provisional application Ser, No. 60/068,546 filed Dec. 23, 1997.

BACKGROUND OF THE INVENTION

1. Field of the Invention

The present invention relates, in general, to integrated circuits and, more particularly, to integrated circuits having voltage regulator circuits generating a power supply voltage from an external power supply voltage.

2. Relevant Background

Integrated circuits (ICs) comprise thousands or millions of individual devices interconnected to provide desired functionality. Significant effort is expended to improve processing techniques so as to reduce the size of each individual device in order to provide greater functionality on a given IC chip at reduced cost. In general, smaller geometry devices operate faster while dissipating less power than do larger geometry devices. As device geometries are reduced the breakdown voltages of the devices and the isolation that separates the devices decreases also.

Electronic systems usually comprise ICs manufactured with a variety of technologies. This has created a need for multiple power supply voltages to be supplied to a single printed circuit board to support the various types of devices on that board. For example, devices are available that require power supply voltages ranging from 5.0 volts to 3.3 volts, 2.8 volts or lower. A practical solution to this disparity is to provide voltage regulator circuitry that decreases the higher voltage (e.g., 5.0V in the above example) to the lower voltage required by the small geometry device (e.g., 3.3 V or 2.8V). Hence, it is necessary to regulate the available power supply voltage to provide voltages consistent with that required by each of the small geometry ICs.

A conventional voltage regulator is designed to generate a lower voltage than the available supply voltage. Typically, a transistor is coupled in series between the external voltage node and the internal voltage supply node. The conductivity of the transistor is modulated to drop the excess voltage across the transistor. Linear regulators have many desirable characteristics such as simplicity, low output ripple, high quality line and load regulation, and fast recovery time. However, linear regulators are inefficient resulting in wasted power and excess heat generation.

Switching regulators, including ripple regulators, are becoming more common because of their characteristic high efficiency and high power density (i.e., power-to-volume ratio) resulting from smaller magnetic, capacitive, and heat sink components. Switching regulators indirectly regulate an average DC output voltage by selectively storing energy by switching energy on and off in an inductor. By comparing the output voltage to a reference voltage the inductor current is controlled to provide the desired output voltage.

Switching regulators exhibit longer hold-up times than linear regulators which is a characteristic that is important in computer applications. Switching regulators accept a wider range of input voltages with little effect on efficiency making them particularly useful in battery powered applications. However, peak-to-peak output voltage ripple of a switching regulator is typically greater than that of linear regulators. Also, ripple regulators have an initial accuracy (i.e., accuracy immediately after a load current change) error because the average output voltage value is indirectly regulated. Ripple regulators are also susceptible to instabilities due to noise coupling, especially when the power switches within the main power topology are being turned on and/or off. Hence, significant development effort is directed at reducing the voltage ripple of switching regulators.

To limit undesirable voltage ripple on the internal voltage supply node, the time constant of the regulator is desirably much longer than the internal cycle of the loading device. This prevents undesired voltage ripple within a cycle that can upset analog voltage levels. One way of controlling ripple is to heavily filter the regulator output by coupling a large capacitor between the internal voltage supply node and ground. In practice, however, filter capacitors consume a great deal of area without adding functionality. Cost and circuit size considerations dictate limiting the filter capacitor to more modest sizes. Hence, it is desirable to minimize voltage ripple in ways that do not require large filter capacitors.

Another technique to minimize ripple is to use a hysteretic comparator to compare the output voltage to a reference voltage. The hysteretic comparator output drives a switching transistor that controls current in the inductor. However, it is difficult to generate accurate hysteresis as well as provide the ability to program the hysteresis using off-chip components. One prior solution is to use a Schmidtt trigger with an amplifier/comparator having an output and a non-inverting input brought out to pins of the IC. Although this allows the user to program the hysteresis by connecting the external feedback resistor, in many cases, the internal resistor that defines the hysteresis cannot be connected externally because the reference voltage used is not allocated a pin. Although this limitation can be overcome by bringing the reference voltage out to a pin of the IC, this solution degrades the system's noise performance as well as raises the cost to manufacture the device. Moreover, the load capacitance created by the pins is significant making the design more complex in addition to degrading overall performance device.

One prior solution uses one comparator with regenerative feedback with the amount of feedback set by two resistors. In these circuits, the reference voltage ($V_{REF}$) must be adjusted each time the ripple or hysteresis voltage is adjusted in order to keep the average output voltage ($V_{OUT}$) constant. Another solution uses a long comparator propagation delay in the order of 500 nanosecond and additional pre-filtering to discriminate noise coupling during the switching intervals of the main power transistors. However, long propagation delays and over filtering result in errors in setting the ripple voltage of component of $V_{OUT}$ especially when the DC/DC converter is operated at high switching frequencies (i.e., greater than about 100 KHz).

SUMMARY OF THE INVENTION

The present invention involves a DC—DC converter having an input node receiving an input voltage $V_{IN}$ and generating an output voltage $V_{OUT}$. A reference voltage generator provides a voltage $V_{REF}$ and a hysteresis voltage generator provides a voltage $V_{HYST}$. A first comparator generates a signal determined from a difference between $V_{REF}$ and $V_{OUT}$. A second comparator generates a signal determined from a difference between $V_{OUT}$ and $V_{HYST}$. A latch is coupled to receive the outputs of the first and second comparators, and to generate an output. A driver circuit receives the latch output and generates a PWM signal used to switch the output stage.

DETAILED DESCRIPTION OF THE PREFERRED EMBODIMENTS

Figure 1:
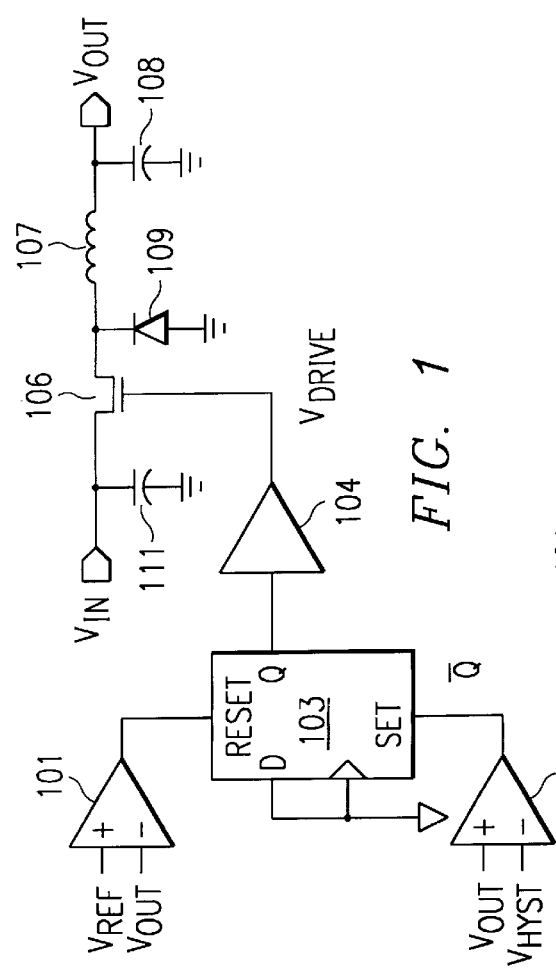
FIG. 1 schematically illustrates a portion of the present invention in a DC/DC regulator.

An embodiment of the present invention is illustrated schematically in FIG. 1. The present invention allows the user to set the minimum and maximum values of the ripple voltage with two reference voltages. The average output voltage is controlled by comparing a reference voltage ($V_{REF}$) to the output voltage ($V_{OUT}$) using a first comparator 101. The ripple regulation is controlled by comparing the second reference voltage ($V_{HYST}$) to $V_{OUT}$ using a separate comparator 102. Desirably, the values of $V_{REF}$ and $V_{HYST}$ are pin programmable (i.e., can be set using signals applied to I/O pins of the IC) using a circuit shown in FIG. 2.

The present invention operates fundamentally as a regulator comprising two distinct comparator elements. A first comparator element 101 is designed to control the average output voltage while a second distinct comparator 102 is designed to control the ripple voltage. The pulse width modulated outputs of these comparators are logically combined using a latch 103 to generate a logic signal input to a driver 104. In the particular implementation, latch 103 comprises a set/reset (SR) latch 103 having its set input coupled to receive the output of comparator 102 and the reset input coupled to receive the output of comparator 101. The non-inverted output Q of latch 103 is coupled to provide the pulse width modulated (PWM) logic signal to driver 104.

The example of FIG. 1 shows a buck regulator output stage in which the output of driver 104 ($V_{DRIVE}$) drives a switch 106 implemented as an n-channel MOSFET. The buck regulator of FIG. 1 is used to step an input voltage VIN down to a lower DC level in the particular example. Switch 106 chops the input DC voltage VIN into a square wave. This square wave is then converted back into a DC voltage of lower magnitude by the low pass filter comprising inductor 107 and capacitor 108. Diode 109 shunts excess voltage to ground while capacitor 111 serves as a preliminary filter to smooth variations in $V_{IN}$. The duty cycle of the square wave relates the output voltage to the input voltage by the equation:

$$V_{OUT} = V_{IN} \times \frac{t_{on}}{t_{on} + t_{off}}$$

where $t_{on}$ and $t_{off}$ describe the duty cycle of the $V_{DRIVE}$ output from driver 104.

Figure 2:
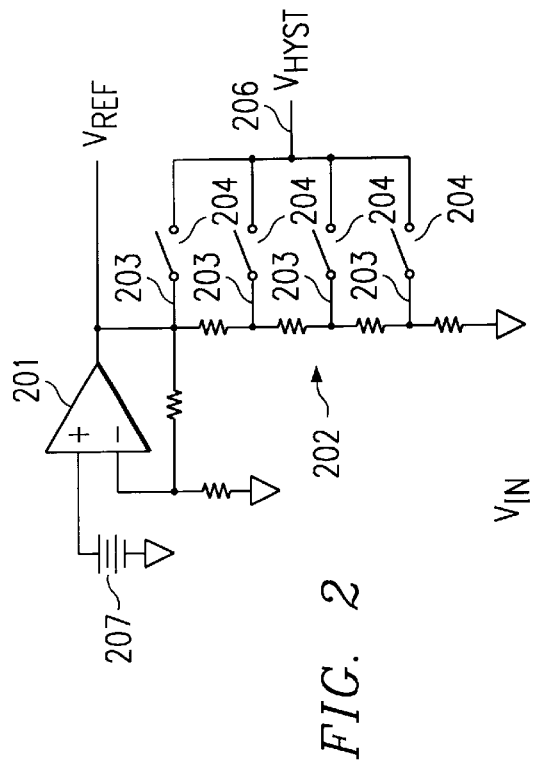
FIG. 2 shows in schematic form an exemplary apparatus for providing programmable hysteresis voltage levels in accordance with the present invention.

FIG. 2 illustrates an exemplary circuit used to generate $V_{HYST}$ from $V_{REF}$. A bandgap reference 207 is buffered and gained up by amplifier 201 to provide $V_{REF}$. $V_{HYST}$ is generated by a resistor divider network 202 having a plurality of taps 203 is formed using any convenient technique. Resistor divider network 202 can be formed on the same IC as the regulator in accordance with the present invention to provide close matching of resistance values over temperature and time. Each tap 203 is coupled through a switch 204 to a summing node 206. $V_{HYST}$ is generated on summing node 206. A logic circuit such as a multiplexor or selector circuit (not shown) receiving data from one or more external I/O pins is used to control switches 204. This feature allows user programmability of $V_{HYST}$. Reference voltage $V_{REF}$ is generated by a high quality reference such as a bandgap reference thus both $V_{REF}$ and $V_{HYST}$ will be suitably stable.

In a particular example, $V_{REF}$ and $V_{HYST}$ are set such that:

$$V_{OUT}(\text{average}) = (V_{REF} + V_{HYST})/2; \text{ and}$$

$$V_{ripple} = V_{REF} - V_{HYST}$$

where $V_{ripple}$ is the desired peak-to-peak voltage ripple on $V_{out}$. In this manner, the regulator in accordance with the present invention is configured as two comparators 101 and 102 each with low propagation delay. By making $V_{REF}$ and $V_{HYST}$ pin programmable, the regulator in accordance with the present invention can be user-adjusted to meet the needs of a particular application.

Setting the peak-to-peak ripple voltage depends on the value of resistor ratio selected by the circuit in FIG. 2 and the absolute value of a supply voltage such as $V_{DD}$. $V_{DD}$ is usually an available logic supply and may have ripple voltage on its output, especially at high frequencies. It is desirable to set $V_{HYST}$ as accurately as possible and as stable as possible. In the circuit shown in FIG. 1, when transistor 106 switches, noise can be coupled back to comparator 101 and comparator 102 through the $V_{OUT}$ line.

Figure 3:
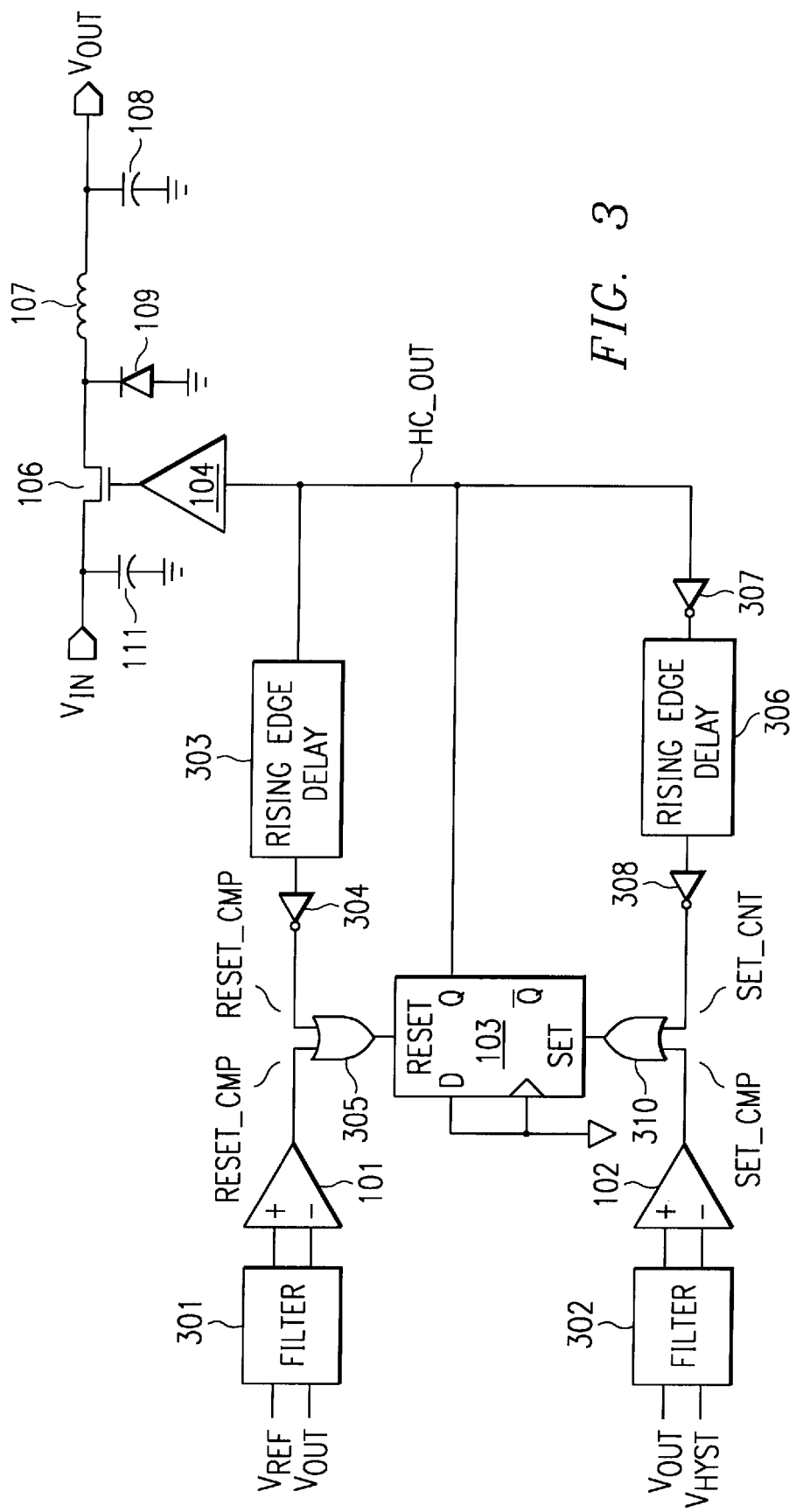
FIG. 3 schematically illustrates a first alternative embodiment in accordance with the present invention.

In the embodiment shown in FIG. 3, noise coupling is reduced by adding matched filters 301 and 302 to the front-end of comparators 101 and 102 and adding monostable multivibrator logic to mask off the S and R inputs of latch 103 for a fixed time during the switching interval of transistor 106. The design and implementation of matched filters 301 and 302 is well understood and so not described in greater detail herein. The monostable multivibrator logic comprises, for example, a two-input OR logic gate 305 having one input coupled to receive the output of comparator 101 (labeled RESET_CMP in FIG. 3) and a second input coupled to receive a masking signal labeled RESET_CNT. The masking signal RESET_CNT is generated by feeding back the HC_OUT signal on the non-inverting output Q of latch 103 through rising-edge delay circuit 303. The output of rising-edge delay circuit 303 is inverted by inverter 304 before it is applied to gate 305. Another two-input OR logic gate 310 has one input coupled to receive the output of comparator 102 (labeled SET_CMP in FIG. 3) and a second input coupled to receive a second masking signal SET_CNT. The second masking signal SET_CNT is generated by feeding back the HC_OUT signal provided by inverter 307 through rising-edge delay circuit 306. The output of rising-edge delay circuit 306 is inverted by inverter 308 before it is applied to gate 305.

Figure 4:
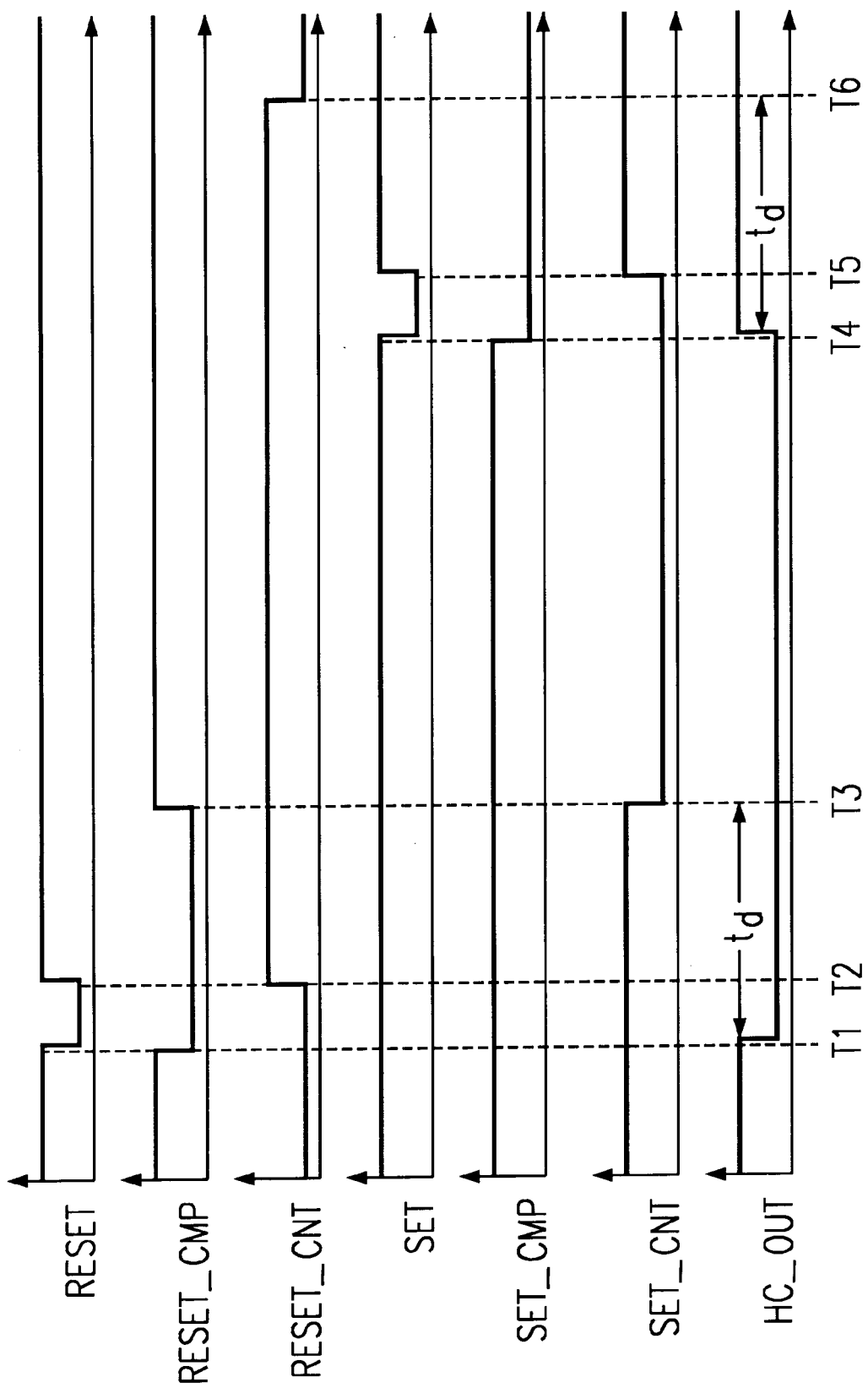
FIG. 4 shows switching waveforms useful in understanding operation of the regulator in accordance with the present invention.

In a first case, transistor 106 is on (i.e., conducting current) and $V_{OUT}$ ripple is increasing. During this time, illustrated at during a time to the left of T1 in FIG. 4, the first masking signal RESET_CNT from inverter 304 is low, enabling the reset input to latch 103. Also during this time, the second masking signal SET_CNT from inverter 308 is high, disabling the set input to latch 103. When $V_{OUT}$ becomes greater than $V_{REF}$ at time T1 the RESET_CMP signal goes low. Shortly after RESET_CMP goes low, the RESET signal goes low to reset latch 103. The HC_OUT signal turns off after a brief propagation delay following RESET going low, and driver 104 begins to turn off transistor 106. Because of rising edge delay 306, the second masking signal SET_CNT remains high during the transition of transistor 106 from on to off. The delay ($t_d$) provided by rising edge delay 306 is selected to be sufficiently long for transients to settle out before enabling the set input. The set input is enabled at time T3 when SET_CNT goes low.

Once the HC_OUT signal from latch 103 goes low and after the delay time $t_d$ defined by rising edge delay 303, the reset input to latch 103 is disabled by RESET_CNT going high. In the examples herein, the delay of rising edge delay 303 is substantially equal to the delay of rising edge delay 306, hence, RESET_CNT goes high at time T3. The reset input will remain disabled by RESET_CNT until the Q output signal, HC_OUT, transitions to a high, which occurs after $V_{OUT}$ falls below $V_{HYST}$ at time T4. Shortly after SET_CMP goes low, the SET signal goes low to set latch 103. The HC_OUT signal turns on after a brief propagation delay following SET going low, and driver 104 begins to turn on transistor 106. Because of rising edge delay 303, the first masking signal RESET_CNT remains high during the transition of transistor 106 from off to on. The delay ($t_d$) provided by rising edge delay 303 is selected to be sufficiently long for transients to settle out before enabling the reset input. The reset input is enabled at time $T_6$ when RESET_CNT goes low.

Figure 5:
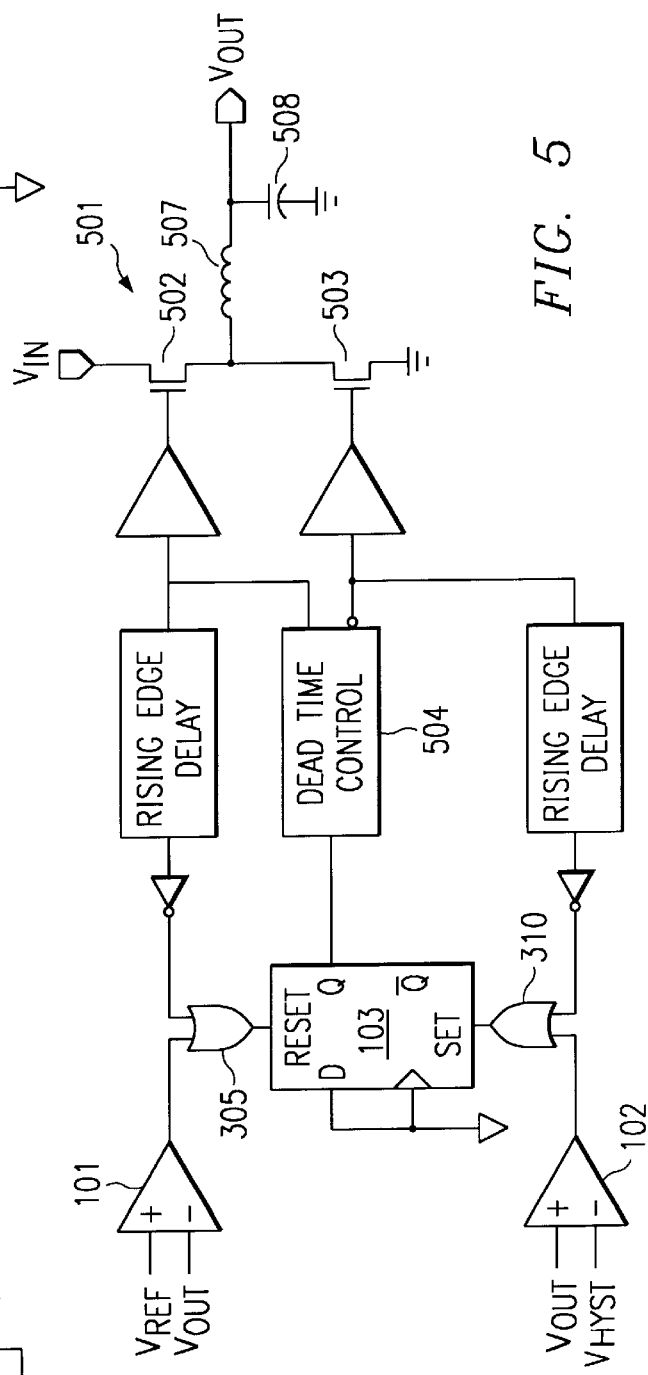
FIG. 5 illustrates another alternative embodiment regulator in accordance with the present invention.

FIG. 5 shows a portion of an alternative embodiment regulator in accordance with the present invention. FIG. 5 shows a synchronous buck power stage 501 used to efficiently convert the input voltage $V_{IN}$ down to a lower DC voltage $V_{OUT}$. In this implementation transistors 502 and 503 receive independent drive signals from dead time control circuit 504 based upon the output of latch 103. Switches 502 and 503 chop the input DC voltage $V_{IN}$ into a square wave. This square wave is then converted into a DC voltage of lower magnitude by a low pass filter comprising inductor 507 and capacitor 508. The embodiment shown in FIG. 5 improves efficiency by replacing freewheeling diode 109 (shown in FIG. 1) with a low on-resistance MOSFET.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A DC—DC converter comprising:
    an input node receiving an input voltage $V_{IN}$;
    a pulse width modulation (PWM) unit coupled to chop said input voltage $V_{IN}$ into a square wave under control of a $V_{DRIVE}$ signal;
    an output stage converting the chopped input voltage $V_{IN}$ to an output voltage $V_{OUT}$ coupled to an output node;
    a reference voltage generator providing a voltage $V_{REF}$;
    a hysteresis voltage generator providing a voltage $V_{HYST}$;
    a first comparator generating a signal determined from a difference between said voltage $V_{REF}$ and said output voltage $V_{OUT}$;
    a second comparator generating a signal determined from a difference between said output voltage $V_{OUT}$ and said voltage $V_{HYST}$;
    a latch coupled to receive the outputs of the first and second comparator, the latch generating an output; and
    a driver circuit coupled to receive the latch output and generate the $V_{DRIVE}$ signal.

2. The DC—DC converter of claim 1 wherein the output stage comprises a buck regulator stage.

3. The DC—DC converter of claim 1 wherein the output stage comprises a synchronous buck regulator stage.

4. The DC—DC converter of claim 1 wherein the hysteresis voltage generator further comprises:
    a resistor ladder having a plurality of taps;
    a voltage source coupled across the resistor ladder;
    a summing node;
    a switch coupled between the summing node and each tap; and
    a control device coupled to each switch to selectively activate the switch so as to programmably couple each node to the summing node, wherein said voltage $V_{HYST}$ is a voltage on the summing node.

5. The DC—DC converter of claim 4 further comprising:
    a first OR gate coupled between the first comparator output and the latch, the first OR gate comprising a first input coupled to the output of the first comparator, a second input coupled to receive a first masking signal, and an output coupled to the latch; and
    a rising edge delay unit coupled to the latch output to feedback the latch output to provide the first masking signal to the second input of the first OR gate.

6. The DC—DC converter of claim 5 further comprising:
    a second OR gate coupled between the second comparator output and the latch, the second OR gate comprising a first input coupled to the output of the second comparator, a second input coupled to receive a second masking signal, and an output coupled to the latch;
    an inverter coupled to the latch output and provide an inverted latch output signal; and
    a rising edge delay unit coupled to the inverted latch output signal to feedback the inverted latch output to provide the second masking signal to the second input of the second OR gate.

7. The DC—DC converter of claim 1 wherein the latch comprises an SR latch having a set input and a reset input.

8. The DC—DC converter of claim 7 wherein the first comparator further comprises:
    a non-inverting input coupled to said voltage $V_{REF}$;
    an inverting input coupled to said output voltage $V_{OUT}$; and
    an output coupled to the reset input of the SR latch.

9. The DC—DC converter of claim 7 wherein the second comparator further comprises:
    a non-inverting input coupled to said output voltage $V_{out}$;
    an inverting input coupled to said voltage $V_{HYST}$; and
    an output coupled to the set input of the SR latch.

10. A hysteretic comparator for comparing a sample voltage comprising:
    a reference voltage generator providing a voltage $V_{REF}$;
    a hysteresis voltage generator providing a voltage $V_{HYST}$;
    a first comparator generating a signal determined from a difference between said voltage $V_{REF}$ and a voltage $V_{OUT}$;
    a second comparator generating a signal determined from a difference between said voltage $V_{OUT}$ and said voltage $V_{HYST}$;
    a latch having a reset input coupled to the output of the first comparator and a set input coupled to the output of the second comparator, the latch generating an output signal on an output node (Q);

a driver circuit coupled to receive the latch output and generate a $V_{DRIVE}$ signal; and a pulse suppression unit responsive to the latch output signal to disable the reset input in a first operating mode.

11. The hysteretic comparator of claim 10 wherein the hysteresis voltage generator derives said voltage $V_{HYST}$ from a resistor ladder coupled to said voltage $V_{REF}$.

12. The hysteretic comparator of claim 10 further comprising:

an inverter coupled to the latch output signal and generating an inverted latch output signal; and a second pulse suppression unit responsive to the inverted latch output signal to disable the set input in a second operating mode.

13. The hysteretic comparator of claim 12 wherein the first and second pulse suppression units comprise rising-edge delay circuits.

14. The hysteretic comparator of claim 10 wherein the first comparator further comprises:

a non-inverting input coupled to said voltage $V_{REF}$;

an inverting input coupled to said voltage $V_{OUT}$; and an output coupled to the reset input of the latch.

15. The hysteretic comparator of claim 10 wherein the second comparator further comprises:

a non-inverting input coupled to said voltage $V_{OUT}$;

an inverting input coupled to said voltage $V_{HYST}$; and an output coupled to the set input of the latch.

16. The hysteretic comparator of claim 10 further comprising:

a first OR gate coupled between the first comparator output and the reset input of the latch, the first OR gate comprising an input coupled to the pulse suppression unit, and an output coupled to the reset input of the latch; and a rising edge delay unit within the pulse suppression unit and coupled to the latch output to feedback the latch output to provide the first masking signal to the second input of the first OR gate.

17. A method of generating a pulse width modulated signal for driving an output stage of a regulator, the regulator including an input stage receiving an input voltage $V_{IN}$ and an output stage providing an output voltage $V_{OUT}$, the method comprising the steps of:

generating a reference voltage $V_{REF}$;

generating a hysteresis voltage $V_{HYST}$;

comparing said reference voltage $V_{REF}$ to said output voltage $V_{OUT}$ to determine a first binary difference signal;

comparing said output voltage $V_{OUT}$ to said hysteresis voltage $V_{HYST}$ to determine a second binary difference signal;

setting a latch in response to the second binary difference signal;

resetting the latch in response to the first binary difference signal;

generating the pulse width modulated signal by amplifying a latch output signal;

chopping the input voltage $V_{IN}$ into a square wave using the pulse width modulated signal; and converting the square wave into said output voltage $V_{OUT}$ using a low pass filter.

18. The method of claim 17 further comprising:

in a first mode, disabling the latch from setting for a preselected time after a rising edge occurs on the latch output signal; and in a second mode, disabling the latch from resetting for the preselected time after a falling edge occurs on the latch output signal.

* * * * *